United States Patent
Kolinummi et al.

(10) Patent No.: US 9,817,705 B2
(45) Date of Patent: Nov. 14, 2017

(54) METHOD FOR ENABLING A COMMUNICATION BETWEEN PROCESSES, PROCESSING SYSTEM, INTEGRATED CHIP AND MODULE FOR SUCH A CHIP

(71) Applicant: Nokia Technologies Oy, Espoo (FI)

(72) Inventors: Pasi Kolinummi, Tampere (FI); Juhani Vehviläinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 277 days.

(21) Appl. No.: 14/461,959

(22) Filed: Aug. 18, 2014

(65) Prior Publication Data

US 2015/0135196 A1 May 14, 2015

Related U.S. Application Data

(63) Continuation of application No. 10/187,393, filed on Jun. 27, 2002, now abandoned.

(30) Foreign Application Priority Data

Jun. 28, 2001 (EP) ..................................... 01114829

(51) Int. Cl.
*G06F 9/455* (2006.01)
*G06F 9/54* (2006.01)
*G06F 13/38* (2006.01)

(52) U.S. Cl.
CPC .......... *G06F 9/546* (2013.01); *G06F 9/45533* (2013.01); *G06F 13/387* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 4,412,285 A | 10/1983 | Neches et al. | |
| 4,901,231 A | 2/1990 | Bishop et al. | |

(Continued)

FOREIGN PATENT DOCUMENTS

| | | |
|---|---|---|
| EP | 08 09 382 | 11/1997 |
| EP | 08 73 035 | 10/1998 |

OTHER PUBLICATIONS

Dally, W., *Virtual-Channel Flow Control*, IEEE Transactions on Parallel and Distributed Systems, vol. 3, No. 2 (Mar. 1992) 194-205.

(Continued)

*Primary Examiner* — Tammy Lee
(74) *Attorney, Agent, or Firm* — Alston & Bird LLP

(57) ABSTRACT

The invention relates to a method for enabling in a processing system a communication between at least two activated processes 22, 23. In order to improve the communication between different processes 22, 23 of a processing system, it is proposed that for said communication signals are transmitted between said at least two processes 22, 23 in virtual channels using the same physical channel 28. This enables an efficient use of physical resources. A corresponding processing system comprises at least one processor 50-52 for running different processes, at least one physical channel provided for enabling a communication between at least two of said different processes, and means 55-57 for distributing signals which are to be transmitted for such a communication between said at least two different processes to different virtual channels on said at least one physical channel.

13 Claims, 7 Drawing Sheets

(56) References Cited

U.S. PATENT DOCUMENTS

| | | |
|---|---|---|
| 5,062,140 A | 10/1991 | Inanaga et al. |
| 5,379,297 A | 1/1995 | Glover et al. |
| 5,463,629 A | 10/1995 | Ko |
| 5,495,619 A | 2/1996 | May et al. |
| 5,574,934 A | 11/1996 | Mirashrafi et al. |
| 5,583,990 A | 12/1996 | Birrittella et al. |
| 5,603,059 A | 2/1997 | Churchill et al. |
| 5,659,796 A | 8/1997 | Thorson et al. |
| 5,828,746 A | 10/1998 | Ardon |
| 5,850,434 A | 12/1998 | Ardon |
| 5,892,923 A | 4/1999 | Yasuda et al. |
| 6,005,851 A | 12/1999 | Craddock et al. |
| 6,014,690 A | 1/2000 | VanDoren et al. |
| 6,101,181 A | 8/2000 | Passint et al. |
| 6,178,453 B1 | 1/2001 | Mattaway et al. |
| 6,212,361 B1 | 4/2001 | Lui |
| 6,222,845 B1 | 4/2001 | Shue et al. |
| 6,354,748 B1 | 3/2002 | Vrvilo |
| 6,393,506 B1 | 5/2002 | Kenny |
| 6,393,569 B1 | 5/2002 | Orenshteyn |
| 6,674,720 B1 | 1/2004 | Passint et al. |
| 6,751,712 B2 | 6/2004 | Iizuka |
| 6,792,505 B2 | 9/2004 | Otterness et al. |
| 6,856,950 B1 | 2/2005 | Abts et al. |
| 7,114,043 B2 | 9/2006 | Rowlands |
| 7,269,695 B2 | 9/2007 | Rowlands |
| 2002/0042864 A1 | 4/2002 | Iizuka |
| 2002/0129206 A1 | 9/2002 | Khare et al. |

OTHER PUBLICATIONS

IEEE Standard for a High Performance Serial Bus—Amendment 1; IEEE Std. 1394a-2000, (Amendment to IEEE Standard 1394-1995).
European Search Report for Application No. EP 01 11 4829 dated Dec. 14, 2001.
Office Action for European Application No. EP 01 114 829.3 dated Jul. 25, 2007.
International Search Report for Application No. PCT/IB02/02295 dated Dec. 27, 2002.
International Preliminary Examination Report for Application No. PCT/IB02/02295 dated Sep. 16, 2003.
Office Action for U.S. Appl. No. 10/187,393, dated Sep. 21, 2005.
Office Action for U.S. Appl. No. 10/187,393, dated Mar. 14, 2006.
Office Action for U.S. Appl. No. 10/187,393, dated Sep. 7, 2006.
Office Action for U.S. Appl. No. 10/187,393, dated Mar. 7, 2007.
Office Action for U.S. Appl. No. 10/187,393, dated Jan. 10, 2008.
Office Action for U.S. Appl. No. 10/187,393, dated Jul. 16, 2008.
Office Action for U.S. Appl. No. 10/187,393, dated Jan. 12, 2009.
Office Action for U.S. Appl. No. 10/187,393, dated May 21, 2009.
Office Action for U.S. Appl. No. 10/187,393, dated Nov. 24, 2009.
Office Action for U.S. Appl. No. 10/187,393, dated Jul. 19, 2010.
Office Action for U.S. Appl. No. 10/187,393, dated Oct. 26, 2010.

METHOD FOR ENABLING A COMMUNICATION BETWEEN PROCESSES, PROCESSING SYSTEM, INTEGRATED CHIP AND MODULE FOR SUCH A CHIP

CROSS-REFERENCE TO RELATED APPLICATIONS

The present application is a continuation of U.S. application Ser. No. 10/187,393, filed Jun. 27, 2002, the contents of which are incorporated by reference herein in their entirety.

FIELD

The invention relates to a method for enabling in a processing system a communication between at least two activated processes. The invention equally relates to a corresponding processing system, to an integrated chip comprising at least one processor for running processes in said integrated chip, and to a module for such an integrated chip.

BACKGROUND

A process is an active part of a processing system which is run by a processor and which is capable of performing certain basic data transfer operations. It is known in particular to implement processes in integrated circuits (IC), like Application Specific Integrated Circuits (ASIC), or in independent functional blocks, either integrated in a chip.

Such a process can be implemented as hardware or software process. Modern software architectures for example are based on multiple processes that are controlled by an operating system. The architecture can comprise a single or several processors. In a single processor system, processes are executed one after another, even though within a larger time window they seem to operate in parallel. Since the operations performed by different processes may be interdependent, a possibility has to be provided which enables the processes to share information among each other.

In a single processor system this is usually done via a common database or memory to which the respective information is stored by a source process and from which the information is retrieved by a destination process, since multiple processes of a single processor cannot transfer information simultaneously. In systems with more than one processor as active components, processes can be executed simultaneously. Still they need to transfer information, like data, to each other. In that case, data can be transferred directly by a source process to a destination process. If the two processes are running in different chips, the message transfer will usually cause in addition an automatic notification of the destination process when the receiver of the chip with the destination process has received the data. Alternatively, processes can send pure notifications to each other, e.g., for waking up the destination process.

FIG. 1 illustrates different communications that might be required between different processes running in an integrated circuit, e.g., in an ASIC, on a single chip. In the figure, a chip 10 comprises at least one processor capable of running several processes 11. Each process 11 is depicted in the figure as a cloud. The chip 10 further comprises several interfaces 12 depicted as rectangles. Several communications that might be required between different processes 11 and between processes 11 and interfaces 12 are indicated by arrows. Equally, communications between processes of the depicted chip with processing running on other chips not shown in the figure might become necessary.

The required communication structure, i.e., all communications that might become necessary in a processing system between different processes, can be quite different depending on the application. In particular, the number of required parallel processes and the number of physical components can vary. But also for a specific processing system, the communication structure is often difficult to predict. Thus it is commonly agreed upon that the communication structure has to be flexible enough to allow a communication between all possible combinations of processes. Another requirement is that all communication within one chip should be carried out in a similar manner in order to decrease the communication burden. Ideally, also processes in different chips should communicate in a similar manner.

Moreover, it is usually two different basic types of messages that have to be transferred between a source process and a destination process, namely data messages and notification messages. A data transfer commonly consists of a stream of multiple bits, for example audio or video streams. The length of the streams can vary, and they can contain different header information to allow various message protocols.

Notification messages, in contrast, provide some additional information to the destination process, and can inform e.g., about some transmitted data. The additional information can be for example a status or an interrupt signal. Notification messages between different processes are currently transferred as separate flag signals for which no coding is used. The number of flags can be quite high if multiple integrated chips are interconnected.

Notification and data transfer have different characteristics. A notification has to be fast and predictable in its timing with a fixed latency time, while a data transfer requires a reasonable average communication bandwidth to enable the transfer of a large amount of data within a certain time. Because of these different requirements, notification and data transfer are dealt with separately, i.e., all communication channels and status and/or interrupt signals are currently transferred separately for each process. The data transfer is done on one or multiple communication wires, and each notification message requires a separate physical flag signal. This has lead to a solution with many buses and status signals, and thus with many hardware resources.

In conventional communication structures, the number of possible connections and the additional division into notification messages and data leads to a problem because of tight pin limitations on the chips. The number of pins is considerable if all possibly required communication are to be made possible. Since all independent functional blocks need flags, the number of pins required for the connections also increases significantly with the number of independent functional blocks. The great number of pins is a common problem in almost all current ASIC and standard processors.

Since in conventional solutions, moreover all possible connections have to be fixed in hardware design, which affects the hardware development schedule and might not lead to an optimal solution, because all requirements are usually not know in the hardware implementation phase.

The problem arises equally for hardware and software processes, since the required communications are similar.

BRIEF SUMMARY

It is an object of the invention to improve the communication between different processes of a processing system.

This object is reached with a method for enabling in a processing system a communication between at least two activated processes. For the communication, signals are transmitted between the at least two processes in at least two virtual channels using the same physical channel. That is, the processing system comprises one or more physical channels of which at least one is employed for transmitting signals in virtual channels.

The object is equally reached with a processing system comprising at least one processor for running different processes, i.e., the different processes may be run by the same processor or by different processors. The system moreover comprises at least one physical channel provided for enabling a communication between at least two of said different processes, and means for distributing signals which are to be transmitted for such a communication between at least two of said different processes to different virtual channels on said at least one physical channel.

The object of the invention is further reached with an integrated chip comprising at least one processor for running at least two different processes in said integrated chip. The chip comprises in addition at least one physical channel provided for enabling a communication between different processes run in said integrated chip, and means for distributing signals that are to be transmitted for such a communication between processes run in the integrated chip to different virtual channels on the at least one physical channel. The latter means are to correspond to those of the proposed processing system.

Alternatively or in addition, the physical channel is arranged between two different integrated chips each comprising at least one processor for running at least one process. In this case, the proposed integrated chip has to comprise an interface to the external physical channel provided for enabling a communication between the at least one process in the integrated chip and at least one other process running in another integrated chip. Moreover, the alternative integrated chip comprises means for distributing signals that are to be transmitted for such a communication between processes running in said integrated chip and in another integrated chip to different virtual channels using said at least one external physical channel. The means for distributing signals to virtual channels are to correspond again to those of the proposed processing system.

The proposed integrated chips can be in particular constituted by ASICs.

Finally, the object of the invention is reached with a module for an integrated chip comprising processing means for handling signals that are to be transmitted between different processes running in said integrated chip and/or between a process running in said integrated chip and a process running in another integrated chip. The proposed module is capable of distributing signals that are to be transmitted between the processes for enabling a communication between said processes to virtual channels on a physical channel within said integrated chip and/or a physical channel connecting said integrated chip and another integrated chip. The means for distributing signals to virtual channels are to correspond again to those of the proposed processing system. The module can be in particular an intellectual property (IP) block.

The use of several virtual or logical channels on one physical channel are described for communications between different network nodes of a network in "Virtual-channel flow control", IEEE Transactions on Parallel and Distributed Systems, Vol. 3, Issue 2, March 1992, pages 194-205, by W. J. Daily. The invention proceeds from the idea that virtual channels could equally be employed for communications between different processes of a processing system, e.g., within or between ASICs. To this end, at least one physical channel is provided which can be used for transmitting signals between different processes in virtual channels. The invention thereby allows to utilize the available physical communication channels more efficiently by increasing the performance per wire and pin.

It is an advantage of the invention that it can be employed flexibly for different communication topologies and the physical communication interface can be serial or parallel. Moreover, the invention can be employed with different communication protocols. That means that the most suitable communication protocol can be selected. Further, the invention is scalable to any number of processes.

As an advantage for the hardware design, the invention allows to minimize the hardware complexity, and the number of pins. Since the power consumption is dependent on external pins, reducing the number of pins will moreover decrease the power consumption. In addition, the wiring area required for connecting processes can be decreased. If the involved processes are implemented in several integrated chips, e.g., in ASICs, the wiring can be decreased both inside each chip and in a printed wire board (PWB) by which several chips are connected.

As an advantage for the software design, the number of available logical channels can be increased and used more flexibly. The purpose of the channels can be designed in the software development and thus decision on possibly required connections is not critical anymore. The logical channels are seen by the software similarly as the physical channels are seen in conventional processing systems.

In sum, an economical solution for communications between processes in a processing system is presented, which solution is capable of fulfilling the communication requirements described above.

Preferably, a physical channel is employed for transmitting different kind of messages between said processes in different virtual channels. It is thus proposed to convert multiple physical channels provided for different transfer requirements to one physical channel, which comprises multiple logical channels provided according to the requirements. This enables a significant decrease in the number of physical channels between functional units. The different kinds of messages can include in particular notification messages and data. Notification messages are transmitted in special logical channels that do not transfer data, but only a one bit notification messages like for example an interrupt request.

The number of logical data streams and the number of notification messages are not limited, and a simple bidirectional serial bus is sufficient for the combined notification message and data stream transfer. Thus the communication requirements can be met while utilizing the available physical communication channels more effectively than separate data and notification channels.

Advantageously, different priorities are assigned to different kinds of signals which are to be transmitted in different virtual channels on the same physical channel. The different priorities can be assigned directly and individually to the signals that are to be transmitted, or indirectly to different virtual channels to which the signals are assigned for transmission according to their characteristics. The proposed prioritisation enables a guarantee of short and predictable latency times for notification messages and a large average bandwidth for data streams. Compared to the current solutions, the performance will thus remain about the same, since with such a prioritization, even long data streams do not delay instant notification messages.

Virtual channels can have different latencies, but the maximum latencies in a specific processing system can be calculated. The maximum latency allows to guarantee a transmission time of messages and thus to build a real-time communication system. The possibility of real time handling enables the use of the invention also in devices like mobile terminals which require that the time for certain operations be predictable.

The processes between which a communication is to be enabled can be hardware or software implemented processes, since the communication between such processes can be handled similarly.

The involved processes can be running on a single chip or on two or more different chips.

Preferably, the communication according to the invention is handled by a dedicated process provided in each chip. This dedicated process can be implemented in software or hardware with the same functionalities. Still, a better and more predictable performance can be expected to be achieved with a hardware implementation, which can be critical in real-time applications. The dedicated process is in particular responsible for dealing with different required properties of the virtual channels. The channel mapping is preferably not fixed and any process can communicate with all other processes. Thus all processes can also utilize all hardware blocks. This moves the decision for hardware resource mapping from hardware design to software design, and thus increases the flexibility of the hardware and allows late changes and task partitions in the software design.

In a hardware implementation, the invention is related in particular to the communication between integrated circuits. Software is a seamless part of an embedded system and thus the usage of the invention can be done with software.

If the processes and the communications between the processes are implemented independently from each other, the number and kind of supplied processes can vary. Communication channels between all processes can thus be made virtually available to allow each process to communicate with all other processes.

The signaling can be realized e.g., similar to the signaling described in "IEEE Standard for a High Performance Serial Bus-Amendment 1", IEEE Std 1394a-2000, for a public serial bus implementation.

BRIEF DESCRIPTION OF THE FIGURES

In the following, the invention is explained in more detail with reference to drawings, of which

DETAILED DESCRIPTION

Figure 1:
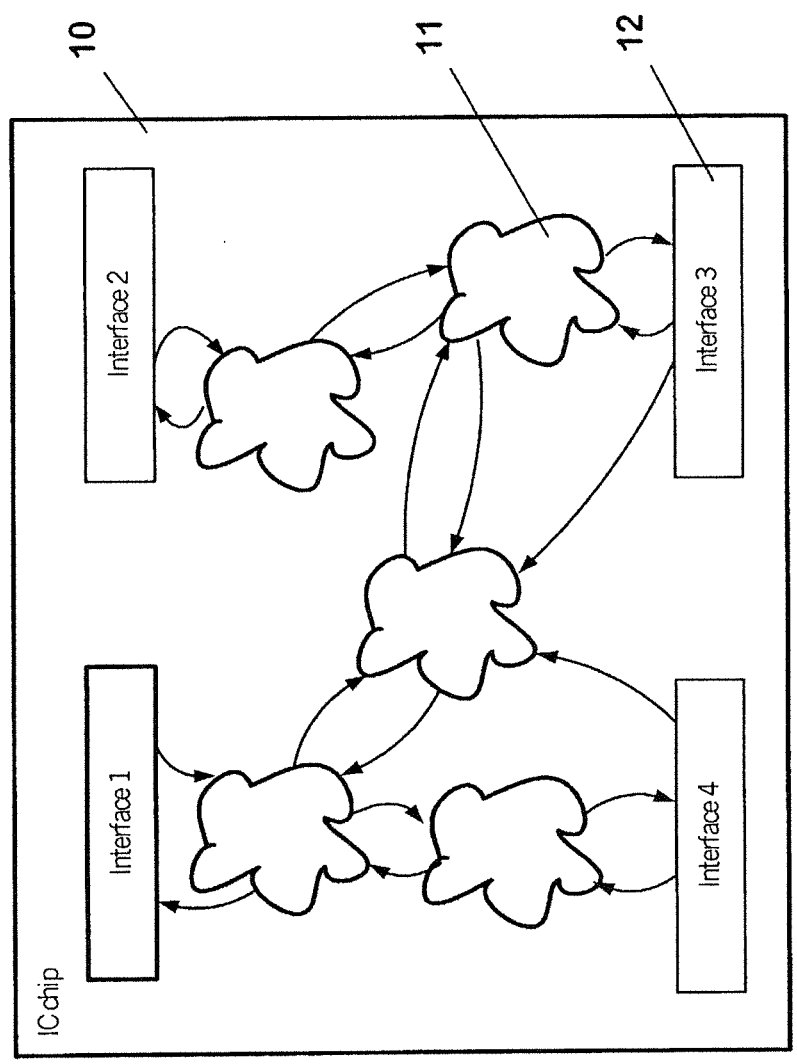
FIG. 1 illustrates the communication between different parallel processes within one chip.

FIG. 1 has already been described in the background of the invention.

Figure 2:
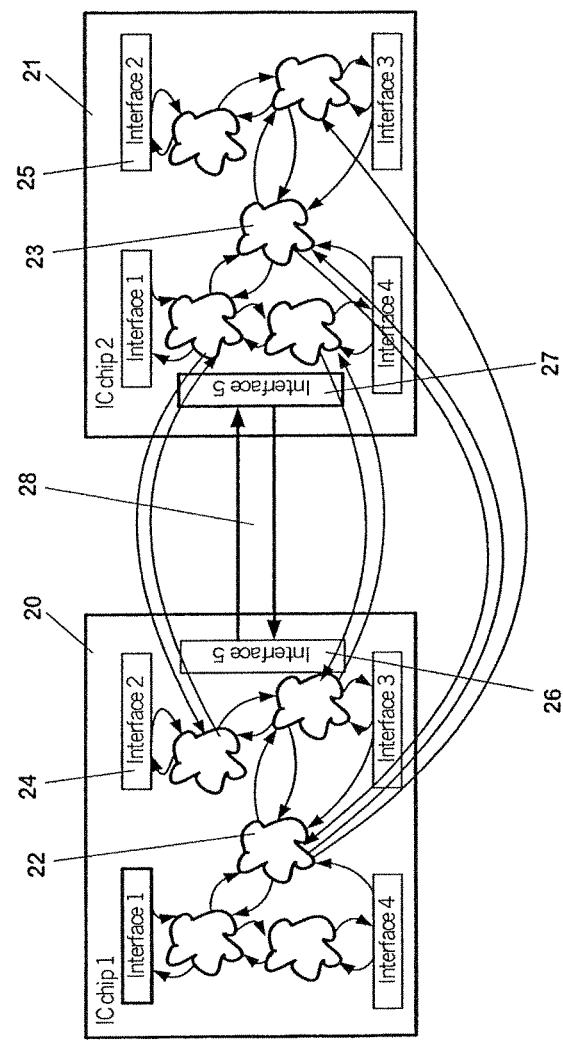
FIG. 2 illustrates the communication between different parallel processes in different chips.

FIG. 2 schematically shows a part of a processing system with two IC chips like the one depicted in FIG. 1. In both chips 20, 21, processes 22, 23 that can be activated by integrated processors are shown again as clouds, interfaces 24, 25 as rectangles and possible communications as arrows. The depicted processes 22, 23 do not only have to communicate within one chip, but also between the two chips 20, 21, as indicated by additional arrows between processes 22, 23 of different chips 20, 21. Moreover, a bi-directional physical channel 28 is shown which interconnects an additional interface 5 included in both of the two chips 20, 21, which interfaces are referred to in the figure by 26, 27.

According to the invention, communications can be carried out freely between all processes 22, 23 of the two chips 20, 21, even though there is only one bi-directional physical communication channel 28 provided between the two chips 20, 21. This is achieved according to the invention by transmitting the signals in virtual channels which are formed on the physical channel 28. The virtual channels can be obtained for example by dividing the available transmission time into transfer frames and by distributing the data and notifications to selected frames or to selected time slots in these frames.

Figure 3:
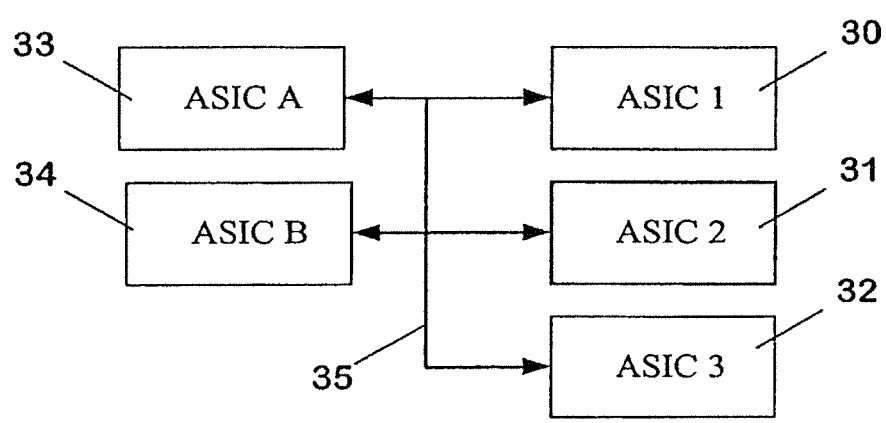
FIG. 3 shows several ASICs connected to the same physical wires in a PCB.

The processing system of FIG. 2 can be extended by additional chips. FIG. 3 schematically illustrates a possible structure for a communication according to the invention between the processes of a processing system with more than two ASICs.

In FIG. 3, five different ASICs 30-34 of a processing system are depicted, ASIC 1,2,3,A and B. Each of these ASICs 30-34 is connected to the same physical wires 35 of a printed circuit board (PCB). A suitable implementation takes care that all requests of communications are served in a timely manner in virtual channels using the same physical wires 35. External flag signals for notification messages are not needed. The structure of FIG. 3 can be enlarged by any number of chips.

Figure 4:
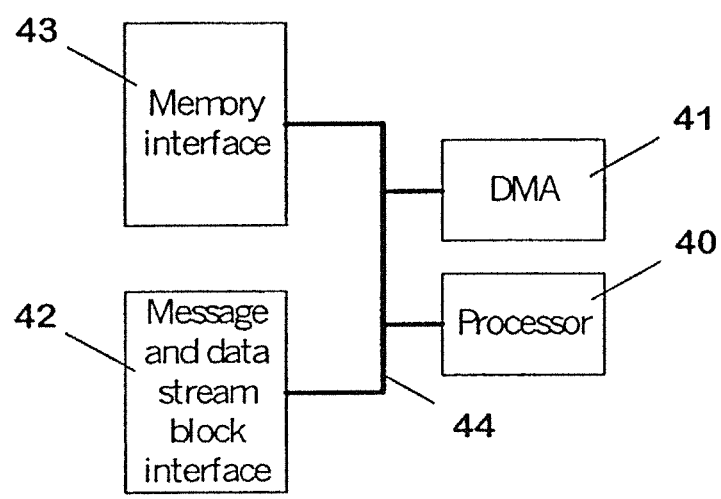
FIG. 4 shows the connection of different components of an ASIC to an internal bus.

FIG. 4 schematically illustrates an exemplary internal structure of any of the ASICs 30 of FIG. 3. The ASIC comprises a processor 40, a direct memory access controller (DMA) 41, a message and data stream block interface 42, and a memory interface 43. All these components 40-43 are connected to an internal bus 44 of the ASIC. Externally, the ASIC can further be connected directly to an I/O bus via the message and data stream block interface 42 and to a memory bus via the memory interface 43. The memory bus can connect the ASIC with an external memory, while the I/O bus can be provided by the physical wires 35 of FIG. 3 and thus be used as connection to other ASICs 31-34.

For communications between different processes of the depicted processor 40, notification messages are transmitted from one process to another one of the processes via the internal bus 44. Data is transmitted from one process via the internal bus 44, the memory interface 43 and the external memory interface to the external memory. A destination process receiving a corresponding notification then demands the stored data from the memory and receives it again via the external memory bus, the memory interface 43 and the internal bus 44. The access to the memory is controlled by the DMA 41.

For communications between a process of the depicted ASIC and a process of another ASIC, notification message and data are transmitted from the processor 40 via the internal bus 44, the message and data stream block interface 42 and the external I/O bus to the other ASIC.

For each or selected ones of the busses, signals are distributed to virtual channels for transmission.

Figure 5:
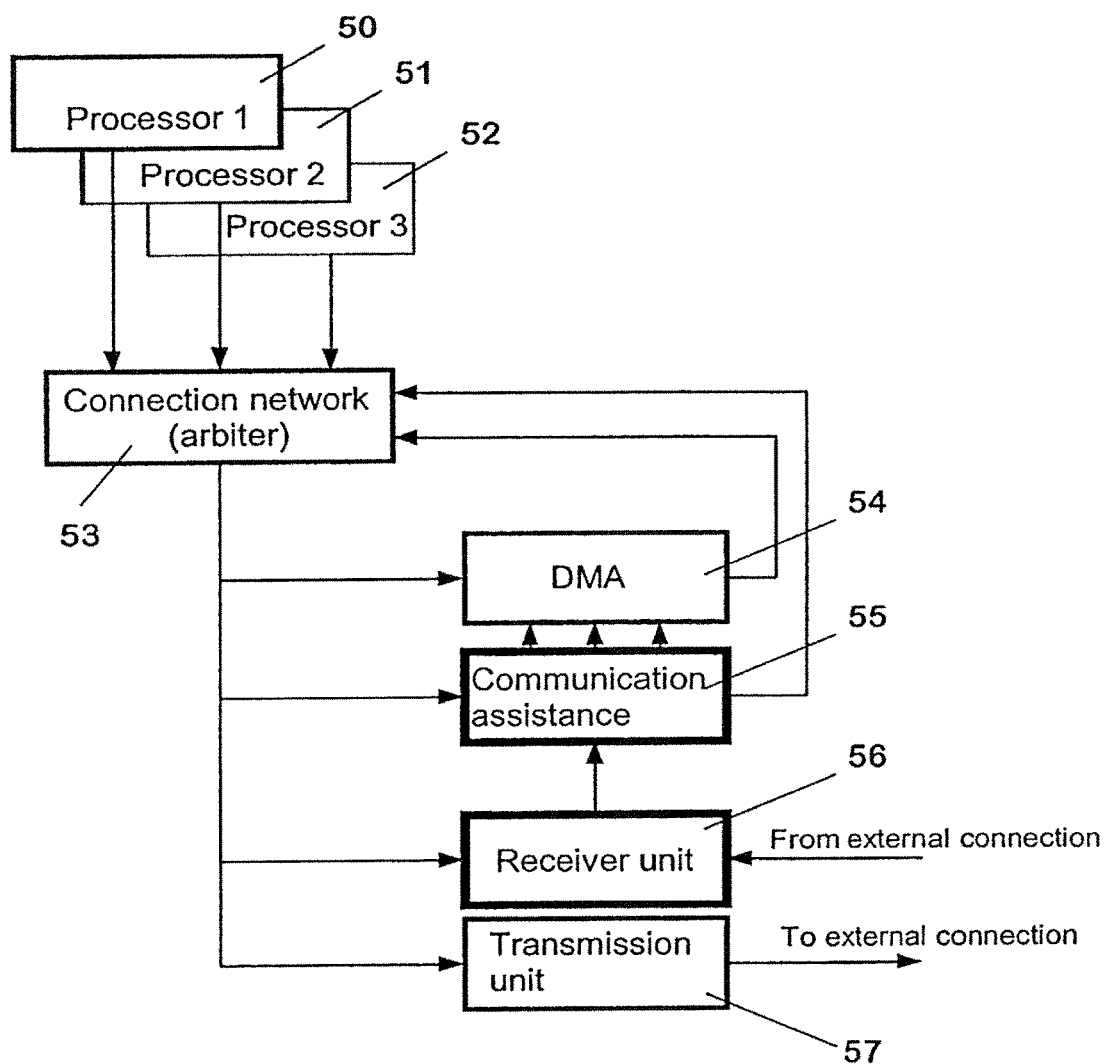
FIG. 5 shows an embodiment of a hardware implementation of the invention within one ASIC.

FIG. 5 schematically illustrates a more specific modular 30 hardware implementation of the invention for an ASIC of a processing system. The implementation is independent of the employed communication protocol and can be realized on top of any physical communication channel. The ASIC can be e.g., one of the ASICs of FIG. 3 or the ASIC of FIG. 4. The ASIC is able to run several processes which have to communicate with each other and with processes of other ASICs.

The ASIC of FIG. 5 comprises three processors 50-52 having access to a connection network 53, which is formed by internal communication busses corresponding to the internal bus 44 of FIG. 4. The ASIC further comprises a direct memory access controller 54, a communication assistance hardware 55, a receiver unit 56 and a transmitter unit 57. The processors 50-52 correspond to the processor 40 of FIG. 4, the DMA 54 to the DMA 41 of FIG. 4, and the receiver unit 56 and the transmitter unit 57 in combination to the message and data stream block interface 42 of FIG. 4.

Each of these components of the ASIC have access to the connection network 53. The transmission unit 57 has further access via external pins to an external bi-directional I/O bus. Equally, the receiver unit 56 has access via external pins to the external bus. The pins of the ASIC and the external bus are not depicted in FIG. 5. The receiver unit 56 is moreover able to forward signals directly to the communication assistance hardware 55. The communication assistance block 55 is able to transmit signals directly to the direct memory access controller. Communication assistance hardware 55 and direct memory controller 54 are software controllable.

Each of the depicted processors 50-52 is designed to run one or more processes, and frequently, several processes of the processing system will be running in parallel or quasi in parallel. Each process may have to communicate with another process run by a processor of the same or of another ASIC, as illustrated in FIG. 2. Each communication includes either only a notification message informing the respective other process about some status change, or a notification message associated to a data transfer. The corresponding signals are written by the source process to the connection network 53 of the ASIC. Communications internal to the ASIC are transmitted via said connection network 53 to the destination process, while communications with external processes are further transmitted in virtual channels via the external I/O bus.

The communication assistance 55 is responsible that all signals transmitted by a source process run by one of the processors 50-52 of the depicted ASIC are transferred correctly and efficiently in virtual channels to a destination process. The communication assistance 55 takes care in particular of special channel requirements for some signals like fast notification transfer and of keeping status registers in each communication assistance coherent. Thus each process sees similar status registers and they do not even have to know where a destination process is located, or where an interface required to perform a specific task is located. Chip boundaries are thus invisible to the processes. Each virtual channel can have a different priority, which affects the information transfer order in case of multiple simultaneous requests. The notification transfer is made fast and predictable with this priority mechanism, by assigning a higher priority to notification messages than to data streams. Thus the worst-case latency time for notification messages is less than two data transfer frame, wherein the frame length can be configured. A transfer frame could have for example a 32-bit data field and a 8-bit header to implement a virtual channel. The worst-case latency time is then the transfer time of 80 bits plus a few clock cycles needed by the communication assistance state machine.

The communication assistance 55 or the processors 50-52 can configure the priorities of each virtual channel inside the receiver unit 56 and the transmission unit 57 by programming. In normal operation mode, the communication assistance 55 and the processors 50-52 thus do not have to take care of the priorities. The processors 50-52 then only need to the know the different properties of the channels, since each message can be assigned automatically in the transmission unit 57 according to its characteristics to an appropriate virtual channel.

In an alternative embodiment, priorities could be assigned individually to each message, but this would imply that each message has to contain in addition an indication of the required priority.

In a first communication example, a source process running in an ASIC with the depicted modular hardware implementation of FIG. 5 wants to transfer a notification implying a status change to a destination process. The source process writes the notification message and transmits it via the connection network 53. The communication assistance 55 of the ASIC is informed about the required transfer of a notification message via the connection network 53. The communication assistance 55 takes care that the status change is transmitted to the destination process, even if the destination process is not in the same integrated chip. To this end, the communication assistance 55 transmits the notification either via the connection network 53 to a process run by a processor 50-52 of the same ASIC, or via the connection network 53, the transmission unit 57 and the external I/O bus to some other ASIC which corresponds to the first ASIC. In the latter case, the notification message is transmitted by the transmission unit 57 in a virtual channel with a high priority on the external I/O bus to the other ASIC with the destination process.

The destination process receives the notification either directly via the connection network or via the communication assistance and the connection network of its ASIC and behaves accordingly. It can for example clear the message indicator. The communication assistance of the second ASIC then takes care that the status change goes back to the source process. In case the destination process is running in another ASIC, the message with the status change is received in the depicted ASIC via the receiver unit 56. The status change is transferred to the communication assistance 55 for updating the status registers. The message is further forwarded either directly via the connection network 53 or via the communication assistance 55 and the connection network 53 to the source process. The actions of the communication assistance 55, or assistances in case of two involved ASICs, is invisible to both processes.

In a second communication example, a source process running in the depicted ASIC has to transfer data to a destination process running in another ASIC connected to the depicted ASIC via the external I/O bus. The second ASIC corresponds again as well to the ASIC depicted in FIG. 5.

The source process writes data targeted to the destination process to the connection network 53. The data reaches the communication assistance 55 of the ASIC via the connection network 53. The communication assistance 55 takes care that the data is transferred correctly to the destination process via the transmission unit 57 in virtual channels on the external I/O bus. The data is transmitted by the transmission unit 57 in a virtual channel to which a low priority but a high bandwidth was assigned. The second ASIC buffers the data preliminarily in its receiver unit before forwarding it via the connection network to the destination process. However, in case a large data stream is received, the data can be transferred automatically by the DMA of the second ASIC to a connected physical memory like an SDRAM, an SRAM or similar.

The destination process further has to be notified that data was transmitted for it. Therefore, the receiver unit of the second ASIC generates a notification message for the destination process. Alternatively, the source process could transmit for each data message a corresponding notification message which would be transmitted like a separate notification message. The communication assistance of the second ASIC also takes care of transferring the notification message to the destination processes. The destination process receives the notification and reads as reaction the transmitted data from the connection network. In case the data was stored in a physical memory, the processor running the destination process can retrieve the data when it has time for handling it. The destination process can then clear the notification status to indicate the end of the communication operation. The communication assistance of the second ASIC takes care as in the first example that the status change is transmitted to the source process. The operations of the communications assistances 55 are again invisible to both processes.

In the ASIC of FIG. 5, the processors 50-52 see many communication channels that can be equally used. The processors do not have to know that the channels are virtual. All hardware operation is hidden from the processors and thus all kind of processors can use the presented communication mechanism.

In the embodiment of FIG. 5, signals are transmitted in virtual channels only between processes running in different ASICs. Virtual channels could be employed in addition within each ASIC.

Figure 6:
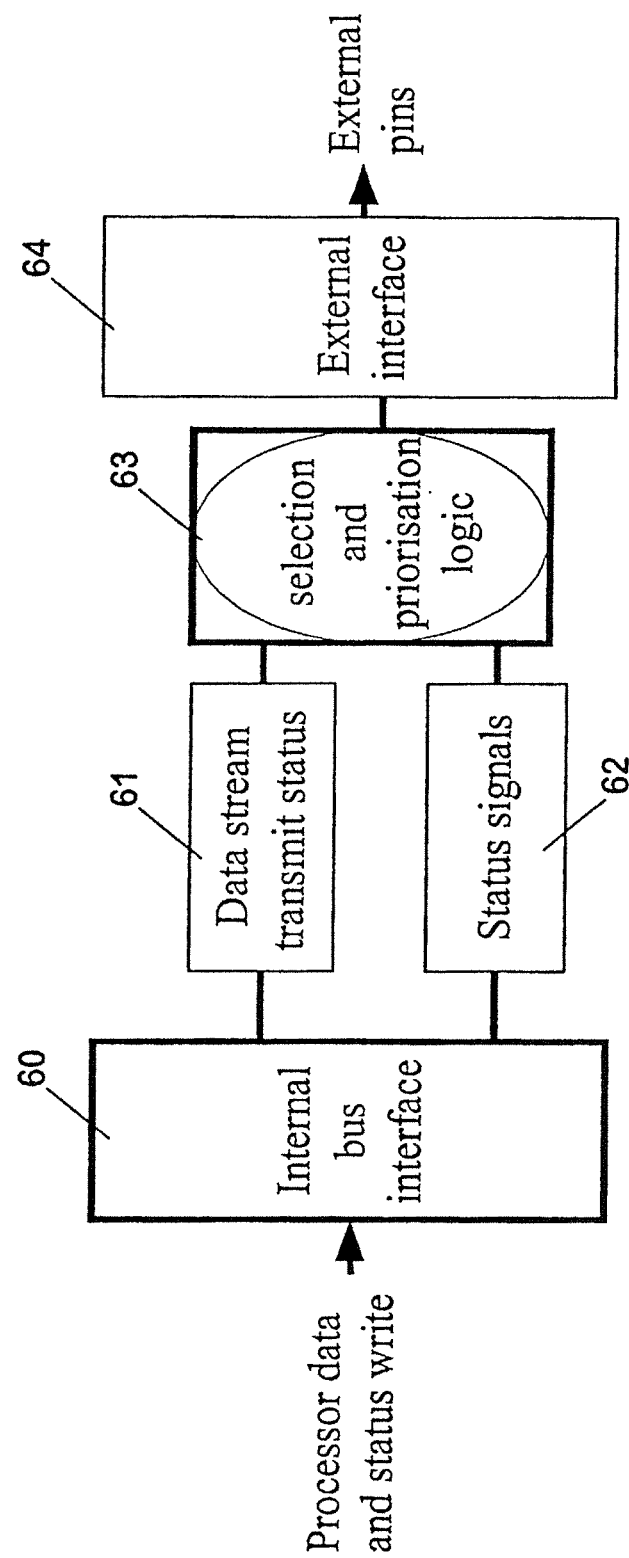
FIG. 6 shows an embodiment of a transmitter unit of the implementation of FIG. 5.
Figure 7:
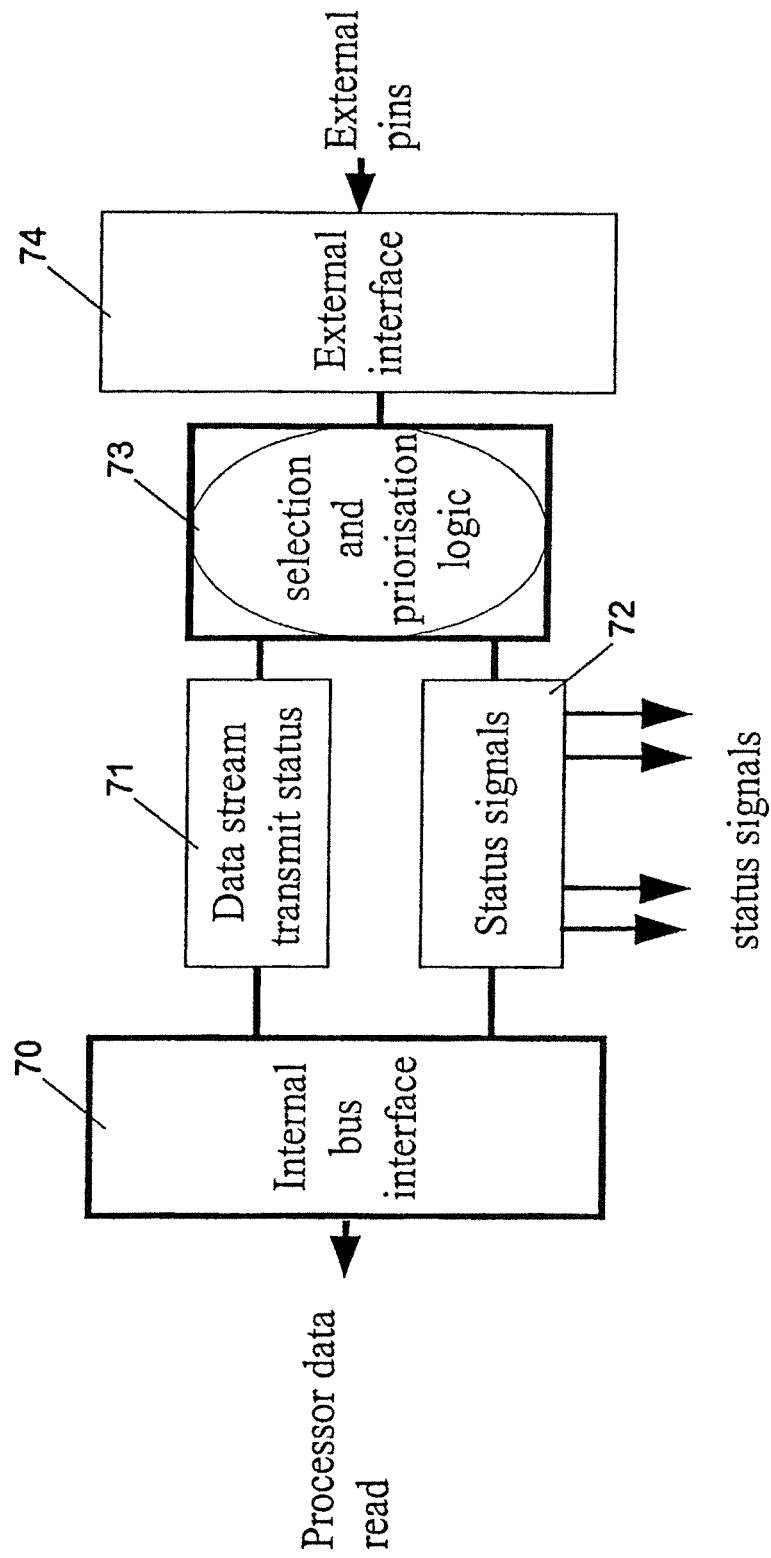
FIG. 7 shows an embodiment of a receiver unit of the implementation of FIG. 5.

FIGS. 6 and 7 schematically show in more detail an embodiment of the receiver unit 56 and an embodiment of the transmission unit 57 of FIG. 5.

The transmission unit 57 of FIG. 6 comprises an internal bus interface 60 which is connected at its input to the connection network 53 of the ASIC. One output of the internal bus interface 60 is connected via a data stream transmit status block 61 and another output via a status signals block 62 to a selection and priorisation logic 63. This selection and priorisation logic 63 is further connected via an external interface 64 to external pins of the ASIC. The pins are not depicted in the figure.

The transmission unit receives via the internal bus interface 60 notification messages or data streams that are to be transmitted. The signals are forwarded via the corresponding block 61, 62 to the selection and priorisation logic 63. Inside the ASIC there are different registers and buffers for data and notifications that are to be sent, e.g., in the transmission unit for enabling smooth communication and priorisation. The status blocks 61, 62 show the status of these registers or of an internal state machine. Status signals provided by the status blocks 61, 62 prevent new data from being written before older data is transmitted.

The selection and priorisation logic 63 assigns received signals to virtual channels according to programming by the communication assistance 55, and forwards the signals via the external interface 64 to the external bus in the respective virtual channels.

FIG. 7 schematically shows a corresponding receiver unit 56 with an internal bus interface 70, a data stream receive status block 71, a status signals block 72, a selection and priorisation logic 73 and an external interface 74. The structure of the receiving unit depicted in FIG. 7 is the same as the structure of the transmission unit of FIG. 6. In addition to the connections of the receiving unit of FIG. 6, in the transmission unit of FIG. 7 the status signals block 72 has a direct connection to the communication assistance 55 of FIG. 5 for status signals relating to notifications from the block 72.

The receiver unit receives signals originating from processes of other ASICs via the external interface 74 distributed to virtual channels. The selection and priorisation logic 73 assembles the original notification messages and data messages again according to a programming by the communication assistance 55. If a data message is received, a notification message is generated to inform the destination process about the received data. The regained and/or generated messages are then transmitted to the addressed processes via the corresponding block 71, 72, the internal bus interface 70 and the connection network 53 of the ASIC. The ASIC comprises different registers and buffers for data and notifications that are received. Similar to the status blocks 61, 62 of the transmission unit of FIG. 6, the status signals provided by status blocks 71, 72 of the receiver unit therefore indicate when received data is ready to be read by the processors. Moreover, status signals of notification messages are transferred to the communication assistance 55 by the status signals block 72. The communication assistance 55 is thus able to keep the status registers in coherence with the communication assistances of connected ASICs of the same processing system. Notification messages could also be transmitted via the communication assistance 55 to the destination process.

The functions integrated in the receiver unit 56 and the transmission unit 57 can vary. If the receiver and the transmitter units 56, 57 are not designed for handling virtual channels, for example, then all communication operations, like prioritisation and sending the highest priority message first, are taken care of by the communication assistance 55.

On the other hand, the functionalities of the communication assistance 55 of FIG. 5 could also be integrated into the receiver unit and the transmission unit of FIGS. 6 and 7.

Alternatively to the hardware implemented communication assistance of FIG. 5, a software process could be implemented for the communication based on the receiver and the transmitter block and on a microprocessor unit or a 30 general purpose processor. Higher and more predictable performance will usually be achieved with a communication assistance hardware, though.

The invention claimed is:

1. A method comprising:
   assigning a first priority to at least a first one of a plurality of virtual channels, wherein the first one of the plurality of virtual channels has a first set of transmission properties;
   assigning a second priority to at least a second one of the plurality of virtual channels, wherein the second one of the plurality of virtual channels has a second set of transmission properties;
   causing transmission of one or more signals in one of the first one of a plurality of virtual channels or the second one of the plurality of virtual channels based on the characteristics of the one or more signals;
   wherein each of the one or more signals is one of a notification signal or a data signal to be transmitted between two or more processes running in one or more integrated chips of a device;
   wherein characteristics of a notification signal cause it to be transmitted using a first virtual channel assigned the first priority and characteristics of a data signal cause it to be transmitted using a second virtual channel assigned the second priority, wherein the first virtual channel operates at a higher priority than that of the first virtual channel such that latency for the notification signals is no more than two data transfer frames; and wherein the first one of a plurality of virtual channels and the second one of a plurality of virtual channels are formed on a same physical channel within the device.

2. The method of claim 1 wherein the transmissions of the one or more signals in one of the first one of a plurality of virtual channels or the second one of the plurality of virtual channels is handled by a dedicated process provided within each of the one or more integrated chips.

3. The method of claim 1 wherein the two or more processes are implemented within a single integrated chip of the device and the first virtual channel and the second virtual channel are formed on the same physical channel within the integrated chip.

4. The method of claim 1 wherein the two or more processes are implemented on at least two different integrated chips of the device and the first virtual channel and the second virtual channel are formed on the same physical channel between the at least two different integrated chips within the device.

5. The method of claim 1 wherein the two or more processes between which a transmission is to be enabled are one of hardware implemented processes, software implemented processes, or hardware and software implemented processes.

6. The method of claim 1 wherein the first priority assigned to the one or more notification signals is a higher priority than the second priority assigned to the second one of the plurality of virtual channels.

7. The method of claim 2 wherein the dedicated process in each of the one or more integrated chips for handling the transmissions in each of the one or more integrated chips is implemented in software or hardware.

8. An integrated chip comprising at least one processor for running at least two different processes in the integrated chip, at least one physical channel enabling a communication between different processes run by the at least one processor in the integrated chip, and communication assistance circuitry, the communication assistance circuitry in association with the at least one processor and the at least one physical channel configured to perform the operations of claim 1.

9. An integrated chip comprising at least one processor for running at least one process in the integrated chip, at least one external physical channel interface enabling a communication between the at least one process in the integrated chip and at least one other process running in another integrated chip, and communication assistance circuitry, the communication assistance circuitry in association with the at least one processor and the at least one external physical channel interface configured to perform the operations of claim 1.

10. An apparatus comprising:
at least one processor;
at least one physical channel enabling a communication between different processes run by the at least one processor; and
transmission circuitry, the transmission circuitry configured to, in association with the at least one processor and the at least one physical channel, cause the apparatus to:
assign a first priority to at least a first one of a plurality of virtual channels, wherein the first one of the plurality of virtual channels has a first set of transmission properties;
assign a second priority to at least a second one of the plurality of virtual channels, wherein the second one of the plurality of virtual channels has a second set of transmission properties;
cause transmission of one or more signals in one of the first one of a plurality of virtual channels or the second one of the plurality of virtual channels based on the characteristics of the one or more signals;
wherein each of the one or more signals is one of a notification signal or a data signal to be transmitted between two or more processes running in one or more integrated chips of a device;
wherein characteristics of a notification signal cause it to be transmitted using a first virtual channel assigned the first priority and characteristics of a data signal cause it to be transmitted using a second virtual channel assigned the second priority, wherein the first virtual channel operates at a higher priority than that of the first virtual channel such that latency for the notification signals is no more than two data transfer frames; and
wherein the first one of a plurality of virtual channels and the second one of a plurality of virtual channels are formed on a same physical channel within the device.

11. The apparatus of claim 10 wherein the transmissions of the one or more signals in one of the first one of a plurality of virtual channels or the second one of the plurality of virtual channels is handled by a dedicated process provided within each of the one or more integrated chips.

12. The apparatus of claim 10 further comprising at least two different integrated chips, wherein the two or more processes are implemented on the at least two different integrated chips and the first virtual channel and the second virtual channel are formed on the same physical channel between the at least two different integrated chips within the device.

13. The apparatus of claim 10 wherein the two or more processes are implemented on at least two different integrated chips of the device and the first virtual channel and the second virtual channel are formed on the same physical channel between the at least two different integrated chips within the device.

* * * * *